United States Patent
Kano et al.

(10) Patent No.: US 9,372,427 B1
(45) Date of Patent: Jun. 21, 2016

(54) CLEANING MEMBER, ASSEMBLED MEMBER, AND IMAGE FORMING APPARATUS

(71) Applicant: FUJI XEROX CO., LTD., Tokyo (JP)

(72) Inventors: Fuyuki Kano, Kanagawa (JP); Minoru Rokutan, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/919,115

(22) Filed: Oct. 21, 2015

Related U.S. Application Data

(63) Continuation-in-part of application No. 14/840,543, filed on Aug. 31, 2015, now abandoned.

(30) Foreign Application Priority Data

Mar. 10, 2015 (JP) .................. 2015-047401

(51) Int. Cl.
*G03G 15/02* (2006.01)
*G03G 21/00* (2006.01)
*B32B 7/12* (2006.01)
*B32B 3/26* (2006.01)

(52) U.S. Cl.
CPC .............. *G03G 15/0225* (2013.01); *B32B 3/26* (2013.01); *B32B 7/12* (2013.01); *G03G 15/0291* (2013.01); *G03G 21/0058* (2013.01); *B32B 2250/02* (2013.01); *B32B 2305/022* (2013.01); *B32B 2432/00* (2013.01)

(58) Field of Classification Search
CPC .................. G03G 15/0216; G03G 15/0225
USPC .................................... 399/100, 176
See application file for complete search history.

(56) References Cited

U.S. PATENT DOCUMENTS

| 8,526,845 B2 * | 9/2013 | Nonaka et al. | G03G 15/0225 399/100 |
| 8,989,618 B2 * | 3/2015 | Kawai et al. | G03G 21/1814 399/100 |

FOREIGN PATENT DOCUMENTS

| JP | 2013-050552 A | 3/2013 |
| JP | 2013-152493 A | 8/2013 |

* cited by examiner

*Primary Examiner* — William J Royer
(74) *Attorney, Agent, or Firm* — Oliff PLC

(57) ABSTRACT

Provided is a cleaning member, including a shaft portion, a foam elastic layer that is disposed helically from one end side in an axial direction to the other end side in the axial direction on an outer circumferential surface of the shaft portion, and an adhesive layer that adheres the shaft portion to the foam elastic layer, wherein the foam elastic layer is subjected to a compression process in a radial direction of the shaft portion at a portion of a circumferential direction at an end portion in the axial direction of the shaft portion, and a circumferential direction coverage width of a non-compressed region at the end portion in the axial direction which is subjected to the compression process is wider than a circumferential direction coverage width at a center portion in the axial direction of the shaft portion.

12 Claims, 16 Drawing Sheets

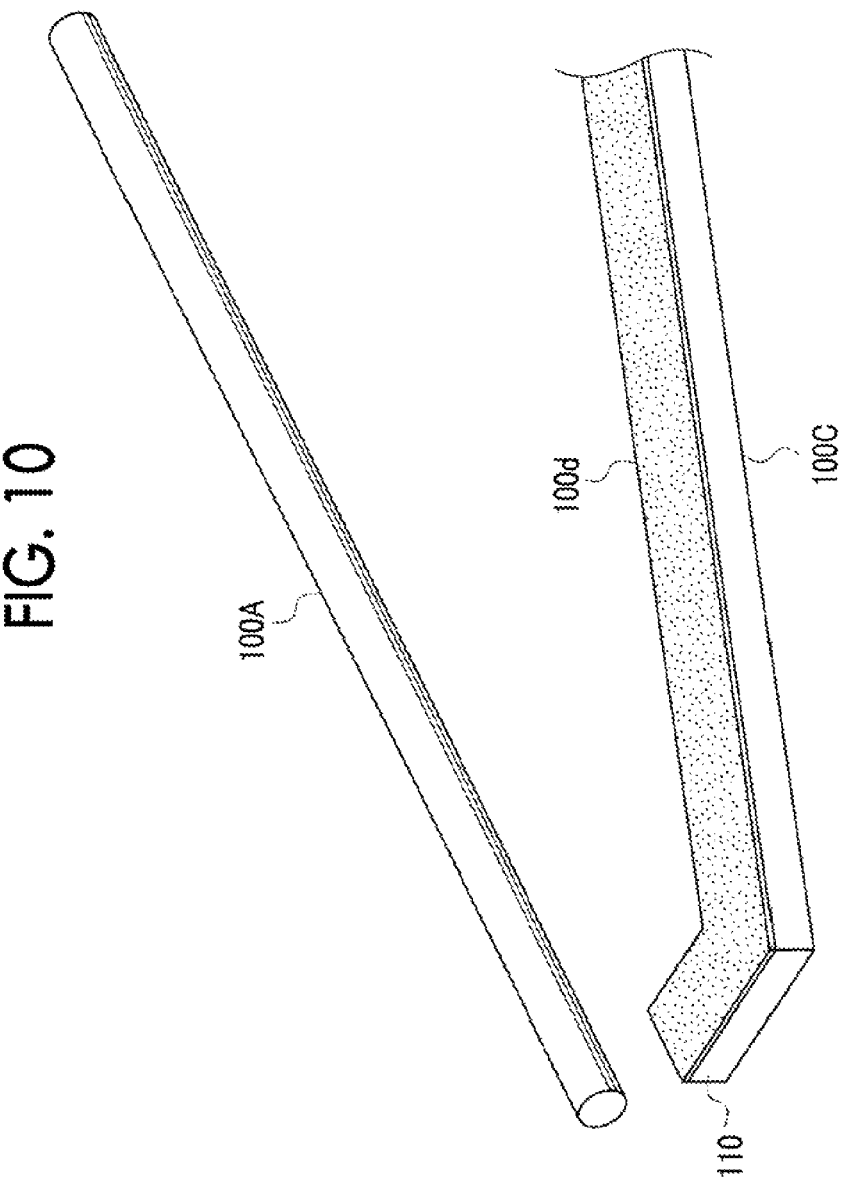

FIG. 16

| CLEANING ROLL | WIDTH × NUMBER OF FOAM ELASTIC LAYERS | THREAD COUNT | END PORTION SHAPE | WIDTH OF END PORTION SHAPE IN AXIAL DIRECTION (BASE; DISTAL END) | TOTAL WIDTH OF END PORTION IN CIRCUMFERENTIAL DIRECTION | WIDTH OF COMPRESSED REGION OF END PORTION IN CIRCUMFERENTIAL DIRECTION | WIDTH OF NON-COMPRESSED REGION OF END PORTION IN CIRCUMFERENTIAL DIRECTION | COVERAGE RATIO IN CIRCUMFERENTIAL DIRECTION | DRIVEN ROTATION PROPERTIES | CLEANING PROPERTIES 10,000 SHEETS | CLEANING PROPERTIES 60,000 SHEETS | PEELING |
|---|---|---|---|---|---|---|---|---|---|---|---|---|
| EXAMPLE 1 | CLEANING ROLL 1 | WIDTH 3 mm × 1 | 2 | SQUARE | 3mm; 3mm | 6mm | 1mm | 5mm | 1.67 | G3.5 | G1 | G2 | G3 |
| EXAMPLE 2 | CLEANING ROLL 2 | WIDTH 3 mm × 1 | 2 | SQUARE | 3mm; 3mm | 5mm | 1mm | 4mm | 1.33 | G3.5 | G1 | G2 | G3 |
| EXAMPLE 3 | CLEANING ROLL 3 | WIDTH 3 mm × 1 | 2 | SQUARE | 3mm; 3mm | 7mm | 1mm | 6mm | 2.00 | G3 | G1 | G1 | G3 |
| EXAMPLE 4 | CLEANING ROLL 4 | WIDTH 3 mm × 1 | 2 | SQUARE | 3mm; 3mm | 8mm | 1mm | 7mm | 2.33 | G2.5 | G1 | G2 | G3 |
| EXAMPLE 5 | CLEANING ROLL 5 | WIDTH 3 mm × 1 | 1 | SQUARE | 3mm; 3mm | 6mm | 1mm | 5mm | 1.67 | G3.5 | G1 | G2 | G3 |
| EXAMPLE 6 | CLEANING ROLL 6 | WIDTH 3 mm × 1 | 3 | SQUARE | 3mm; 3mm | 6mm | 1mm | 5mm | 1.33 | G3.5 | G1 | G2 | G3 |
| EXAMPLE 7 | CLEANING ROLL 7 | WIDTH 3 mm × 1 | 2 | SQUARE | 3mm; 3mm | 6mm | 2mm | 4mm | 1.17 | G3.5 | G1 | G2 | G3 |
| EXAMPLE 8 | CLEANING ROLL 8 | WIDTH 3 mm × 1 | 2 | TRIANGLE | 3mm; 3mm | 6mm | 2.5mm | 3.5mm | 1.67 | G3.5 | G1 | G2 | G3 |
| EXAMPLE 9 | CLEANING ROLL 9 | WIDTH 4 mm × 1 | 2 | SQUARE | 3mm; 3mm | 6mm | 1mm | 5mm | 1.33 | G3.5 | G1 | G2 | G3 |
| EXAMPLE 10 | CLEANING ROLL 10 | WIDTH 6 mm × 1 | 2 | SQUARE | 3mm; 3mm | 9mm | 1mm | 7mm | 1.25 | G3.5 | G1 | G2 | G3 |
| EXAMPLE 11 | CLEANING ROLL 11 | WIDTH 3 mm × 2 | 2 | SQUARE | 3mm; 3mm | 6mm | 1mm | 7mm | 1.17 | G3.5 | G1 | G2 | G3 |
| EXAMPLE 12 | CLEANING ROLL 12 | WIDTH 3 mm × 1 | 2 | SQUARE | 3mm; 3mm | 6mm | 1mm | 5mm | 1.67 | G3 | G1 | G3 | G3 |
| EXAMPLE 13 | CLEANING ROLL 13 | WIDTH 3 mm × 1 | 2 | SQUARE | 4mm; 4mm | 6mm | 1mm | 5mm | 1.67 | G2 | G1 | G3 | G3 |
| EXAMPLE 14 | CLEANING ROLL 14 | WIDTH 3 mm × 1 | 2 | SQUARE | 3mm; 5mm | — | — | — | — | — | — | — | — |
| COMPARATIVE EXAMPLE 1 | COMPARATIVE CLEANING ROLL 1 | WIDTH 3 mm × 1 | 2 | NONE | — | 3mm | 1mm | 2mm | 0.67 | G2 | G3 | G3 | G3 |
| COMPARATIVE EXAMPLE 2 | COMPARATIVE CLEANING ROLL 2 | WIDTH 3 mm × 1 | 2 | SQUARE | 3mm; 3mm | 6mm | 3mm | 3mm | 1.00 | G1 | G2 | G3 | G3 |
| COMPARATIVE EXAMPLE 3 | COMPARATIVE CLEANING ROLL 3 | WIDTH 3 mm × 1 | 2 | SQUARE | 3mm; 3mm | 6mm | 4mm | 2mm | 0.67 | G2 | G3 | G3 | G3 |
| COMPARATIVE EXAMPLE 4 | COMPARATIVE CLEANING ROLL 4 | WIDTH 3 mm × 1 | 2 | SQUARE | 3mm; 3mm | 4mm | 0mm | 4mm | 1.33 | G3 | G3 | G3 | G1 |
| COMPARATIVE EXAMPLE 5 | COMPARATIVE CLEANING ROLL 5 | WIDTH 3 mm × 1 | 2 | SQUARE | 3mm; 3mm | 6mm | 0mm | 6mm | 2.00 | G3 | G3 | G3 | G2 |

CLEANING MEMBER, ASSEMBLED MEMBER, AND IMAGE FORMING APPARATUS

CROSS-REFERENCE TO RELATED APPLICATIONS

This application is a continuation-in-part of U.S. application Ser. No. 14/840,543 filed on Aug. 31, 2015, and is based on and claims priority under 35 USC 119 from Japanese Patent Application No. 2015-047401 filed Mar. 10, 2015, the entire disclosure of which are incorporated herein by reference.

BACKGROUND

Technical Field

The invention relates to a cleaning member, an assembled member, and an image forming apparatus.

SUMMARY

According to an aspect of the invention, there is provided a cleaning member, including:

a shaft portion;

a foam elastic layer that is disposed helically from one end side in an axial direction to the other end side in the axial direction on an outer circumferential surface of the shaft portion; and an adhesive layer that adheres the shaft portion to the foam elastic layer, wherein the foam elastic layer is subjected to a compression process in a radial direction of the shaft portion at a portion of a circumferential direction at an end portion in the axial direction of the shaft portion, and a circumferential direction coverage width of a non-compressed region at the end portion in the axial direction which is subjected to the compression process is wider than a circumferential direction coverage width at a center portion in the axial direction of the shaft portion.

BRIEF DESCRIPTION OF THE DRAWINGS

Exemplary embodiments of the present invention will be described in detail based on the following figures, wherein:

FIG. 10 is a process diagram illustrating a process in an example of a manufacturing method of the cleaning member according to the present exemplary embodiment;

FIG. 16 is a table illustrating evaluation results of the examples and the comparative examples.

DETAILED DESCRIPTION

Figure 1:
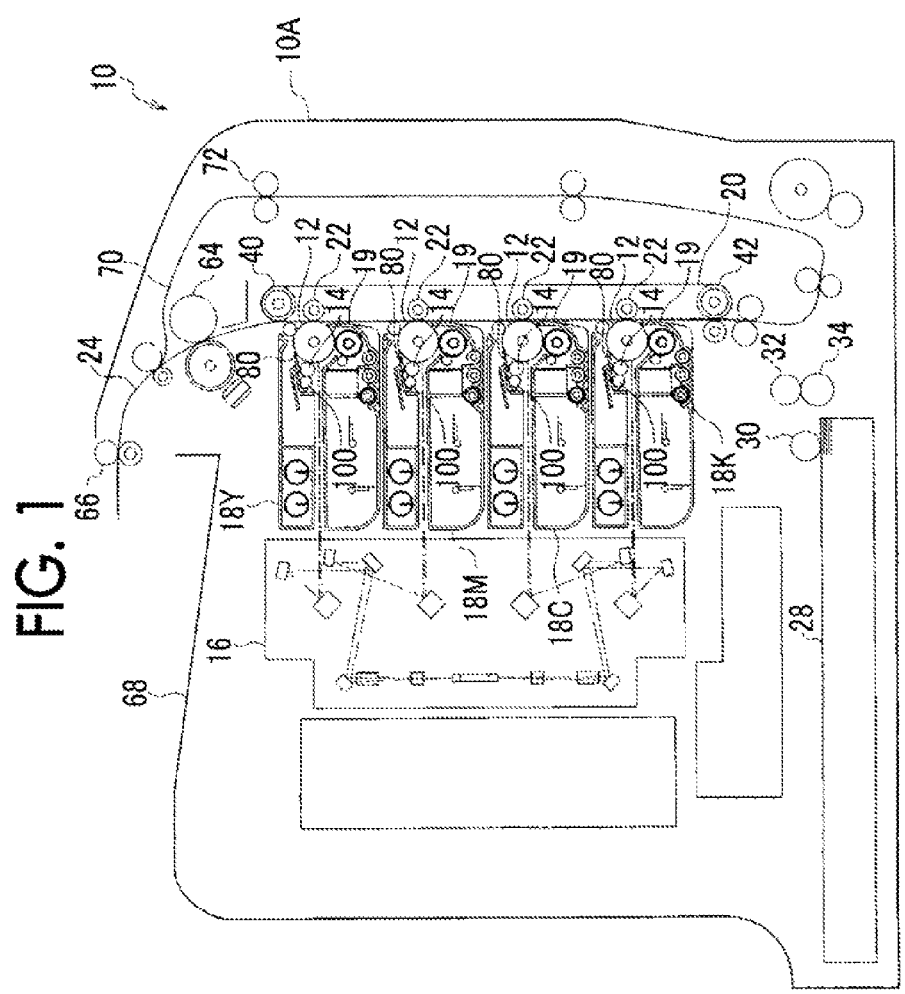
FIG. 1 is a schematic configuration diagram illustrating an electrophotographic image forming apparatus according to the present exemplary embodiment.

Hereinafter, description will be given of an example of an exemplary embodiment according to the invention based on the drawings. Note that, components which have the same functions and operations will be assigned the same reference numerals across all drawings, and there are cases in which description thereof is omitted.

Image Forming Apparatus 10

Description will be given of an image forming apparatus 10 according to the present exemplary embodiment. FIG. 1 is a schematic configuration diagram illustrating the image forming apparatus 10 according to the present exemplary embodiment.

The image forming apparatus 10 according to the present exemplary embodiment is, for example, a tandem system color image forming apparatus, as illustrated in FIG. 1. The image forming apparatus 10 includes an apparatus main body 10A. Process cartridges 18Y, 18M, 18C, 18K (hereinafter referred collectively as 18) which correspond to yellow (Y), magenta (M), cyan (C), and black (K) are provided on the inner portion of the apparatus main body 10A.

Figure 2:
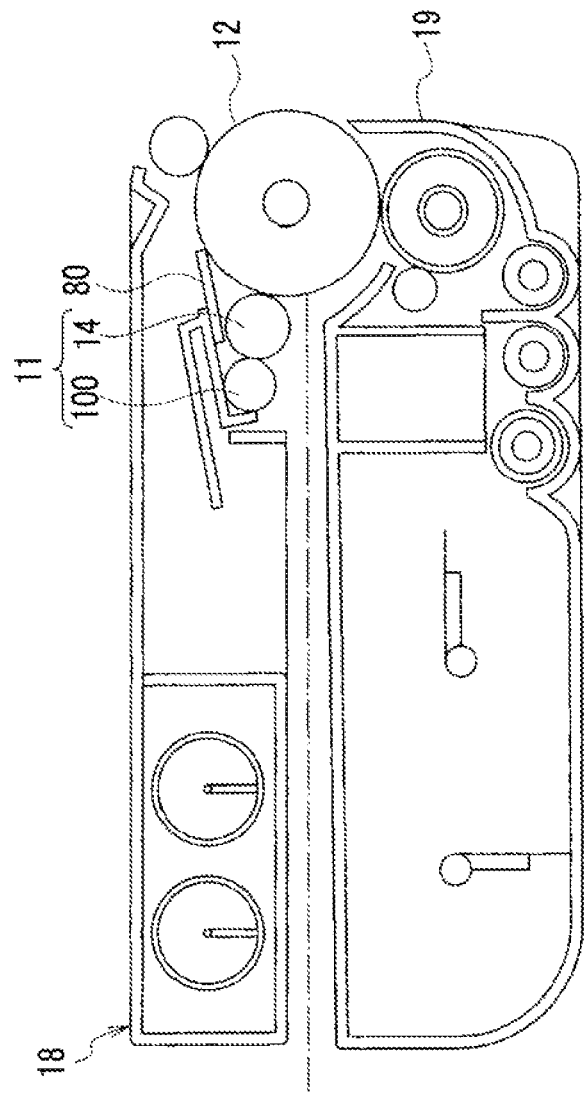
FIG. 2 is a schematic configuration diagram illustrating a process cartridge according to the present exemplary embodiment.

Each of the process cartridges 18 is provided with a photoreceptor 12 (an example of an image holding member, an example of a charged member), a charging device 11 (refer to FIG. 2), and a developing machine 19. The photoreceptor 12 is capable of holding an image, and the charging device 11 includes a charging member 14 (an example of the charging member). The process cartridge 18 may be attached to or detached from the apparatus main body 10A, and functions as an example of an assembled member which is integrally assembled to be attachable and detachable in relation to the apparatus main body 10A. Note that, as the assembled member of this exemplary embodiment, at least the photoreceptor 12 and the charging device 11 may be provided.

After the surface of the photoreceptor 12 is charged by the charging member 14 which is disposed on the surface of the photoreceptor 12, the photoreceptor 12 is subjected to image exposure closer to the downstream side in the rotational direction of the photoreceptor 12 than the charging member 14 by a laser beam which is emitted from an exposure device 16, and an electrostatic latent image corresponding to image information is formed.

Each electrostatic latent image which is formed on the photoreceptor 12 is developed by the developing machine 19 of the corresponding color, yellow (Y), magenta (M), cyan (C), or black (K), to become the toner image of the corresponding color.

For example, when forming a color image, the surface of the photoreceptor 12 of each color is subjected to each process of charging, exposure, and developing corresponding to each color of yellow (Y), magenta (M), cyan (C), and black (K), and the toner image corresponding to each color of yellow (Y), magenta (M), cyan (C), and black (K) is formed on the surface of the photoreceptor 12 of the corresponding color.

The toner image of each color of yellow (Y), magenta (M), cyan (C), and black (K) which is sequentially formed on the photoreceptor 12 is transferred to a recording medium 24 at a location at which the photoreceptor 12 makes contact with a transfer device 22 via a transporting belt 20. The transporting belt 20 is supported from the inner circumferential surface while a tensile force is applied thereto by supporting rolls 40 and 42, and the recording medium 24 is transported on the transporting belt 20 on the outer circumference of the photoreceptor 12. The recording medium 24 onto which the toner images are transferred from the photoreceptors 12 is transported to a fixing device 64, heat and pressure are applied to the recording medium 24 by the fixing device 64, and the toner images are fixed onto the recording medium 24. Subsequently, in the case of simplex printing, the recording medium 24 onto which the toner images are fixed is output by an output roll 66 onto an output section 68 which is provided on the top portion of the image forming apparatus 10.

Note that, the recording medium 24 is retrieved from a storage container 28 by a retrieving roller 30, and is transported to the transporting belt 20 by transport rolls 32 and 34.

Meanwhile, in the case of duplex printing, the recording medium 24, including a first surface (an obverse surface) onto which the toner images are fixed by the fixing device 64, is not output onto the output section 68 by the output roll 66, but the output roll 66 is caused to rotate in reverse in a state in which the rear end portion of the recording medium 24 is nipped by the output roll 66. Accordingly, the recording medium 24 is guided to a duplex transport path 70, and is transported onto the transporting belt 20 again in a state in which the obverse and reverse of the recording medium 24 are inverted by a transport roll 72 which is installed in the duplex transport path 70. The toner images from the photoreceptors 12 are transferred to a second surface (a reverse surface) of the recording medium 24. Subsequently, the toner images of the second surface (the reverse surface) of the recording medium 24 are fixed by the fixing device 64, and the recording medium 24 (the transfer receiver) is output onto the output section 68.

Note that, after the transfer process of the toner image is complete, in the surface of the photoreceptor 12, the residual toner, paper debris, and the like are removed from the surface of the photoreceptor 12 by a cleaning blade 80 for each rotation of the photoreceptor 12, and the surface of the photoreceptor 12 is prepared for the next image forming process. The cleaning blade 80 is disposed on the surface of the photoreceptor 12 closer to the downstream side in the rotational direction of the photoreceptor 12 than the location which makes contact with the transfer device 22.

Note that, the image forming apparatus 10 according to the present exemplary embodiment is not limited to the configuration described above, and a well-known image forming apparatus such as an intermediate transfer system image forming apparatus may be adopted.

Charging Device 11

Figure 3:
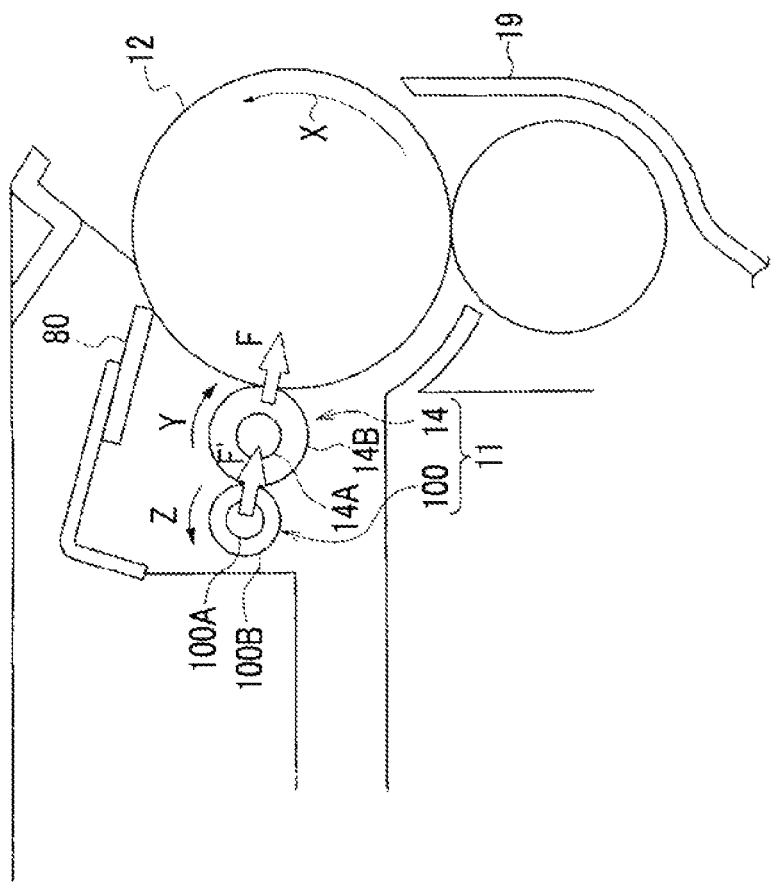
FIG. 3 is a schematic configuration diagram in which a peripheral portion of a charging member (a charging device) in FIGS. 1 and 2 is enlarged.

As illustrated in FIG. 3, the charging device 11 (a charging unit) includes the charging member 14 (an example of the charging member), and a cleaning member 100. The charging member 14 is described earlier and charges the photoreceptor 12, and the cleaning member 100 cleans the charging member 14.

Charging Member 14

For example, the charging member 14 is a roll in which an elastic layer 14B is formed around a conductive core 14A, and the core 14A is supported in a free rotating manner. The charging member 14 is pushed toward the photoreceptor 12 by applying a load F to both ends of the core 14A, is subjected to elastic deformation along the circumferential surface of the elastic layer 14B, and form a nip portion.

Note that, as described later, due to the cleaning member 100 applying a load F' to both ends of the core 14A and being pushed toward the charging member 14, the warping of the charging member 14 is suppressed, and the nip portion is formed between the charging member 14 and the photoreceptor 12.

The charging member 14 follows the rotation of the photoreceptor 12 and rotates in the arrow Y direction due to the photoreceptor 12 being driven to rotate in the arrow X direction by a motor (not shown). Note that, the cleaning member 100 follows the rotation of the charging member 14 and rotates in the arrow Z direction.

Constituent Materials of Charging Member 14

While the configuration of the charging member 14 is not particularly limited, a configuration may be exemplified in which a resin layer is present instead of the core 14A and the elastic layer 14B, or the elastic layer 14B. The elastic layer 14B may adopt a single layer configuration, and may adopt a laminated configuration formed of plural different layers having several functions. Further, the elastic layer 14B may be subjected to surface treatment.

It is desirable to use free-cutting steel, stainless steel, or the like as the material of the core 14A, and to select, as suitable, the material and the surface treatment method according to use such as slidability. It is desirable to subject the core 14A to a plating process. When the core 14A is a non-conductive material, the core 14A may be treated using a general treatment such as a plating process to render the core 14A conductive, and may be used as it is.

While the elastic layer 14B is a conductive elastic layer, materials which may ordinarily be added to rubber may be added to the conductive elastic layer. Examples of such additives include an elastic member such as rubber which has elasticity, a conductive material such as carbon black or ion conductive material which adjusts the resistance of the conductive elastic layer, and, as necessary, a softener, a plasticizer, a curing agent, a vulcanizing agent, a vulcanization accelerator, an antioxidant, and a filler such as silica or calcium carbonate. The charging member 14 is formed by covering the circumferential surface of a conductive core with a mixture to which a material, which is normally added to rubber, is added. A material in which an electrically conductive material is dispersed is used as the conducting agent for adjusting the resistance value, for example. The conductive material may be carbon black or an ionic conductive agent combined with a matrix material which uses at least one of electrons and ions as a charge carrier. The elastic material may be a foam member.

The elastic material which forms the conductive elastic layer is, for example, formed by dispersing a conductive agent in a rubber material. Favorable examples of the rubber material include silicone rubber, ethylenepropylene rubber, epichlorohydrin-ethylene oxide copolymer rubber, epichlorohydrin-ethylene oxide-allyl glycidyl ether copolymer rubber, acrylonitrile-butadiene copolymer rubber and blends of these rubbers. These rubber materials may be foamed or non-foamed.

An electronic conductive agent or an ionic conductive agent is used as the conductive agent. Examples of the electronic conductive agent include fine powders of carbon blacks such as Ketjenblack and acetylene black; pyrolytic carbon and graphite; various conductive metals or alloys such as aluminum, copper, nickel, and stainless steel; various conductive metal oxides such as tin oxide, indium oxide, titanium oxide, tin oxide-antimony oxide solid solution, and tin oxide-indium oxide solid solution; a material in which the surface of an insulating material is rendered conductive; and the like. Examples of the ionic conductive agent include onium perchlorates and chlorates such as tetraethylammonium and lauryl trimethyl ammonium; and alkali metals such as lithium and magnesium, and perchlorates and chlorates such as alkaline earth metals.

One type of the conductive agent may be used in isolation, and two types or more may be used together. While there is no particular limitation on the addition amount, in the case of an electronic conductive agent, it is desirable for the addition amount to fall in a range from 1 parts by weight to 60 parts by weight in relation to 100 parts by weight of rubber material. Meanwhile, in the case of an ionic conductive agent, it is desirable for the addition amount to fall in a range from 0.1 parts by weight to 5.0 parts by weight in relation to 100 parts by weight of rubber material.

A surface layer may be formed on the surface of the charging member 14. Any of resin, rubber, and the like may be used as the material of the surface layer, and there are no particular limitations. For example, favorable examples include a polyvinylidene fluoride, an ethylene tetrafluoride copolymer, a polyester, a polyimide, and a copolymer nylon. A fluoride-based or silicone-based resin may be favorably used for the surface layer. In particular, it is desirable for the surface layer to be formed of a fluorine-modified acrylate polymer.

Cleaning Member 100

Figure 4:
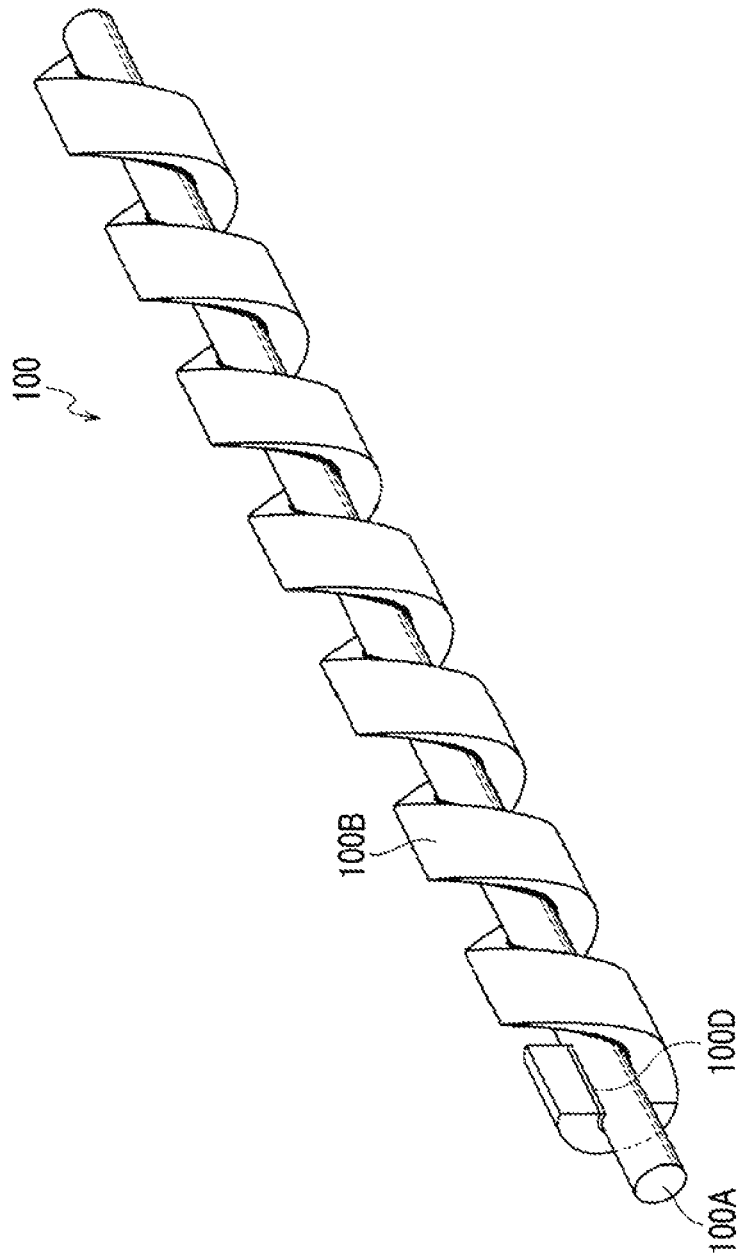
FIG. 4 is a schematic perspective diagram illustrating a cleaning member according to the present exemplary embodiment.
Figure 5:
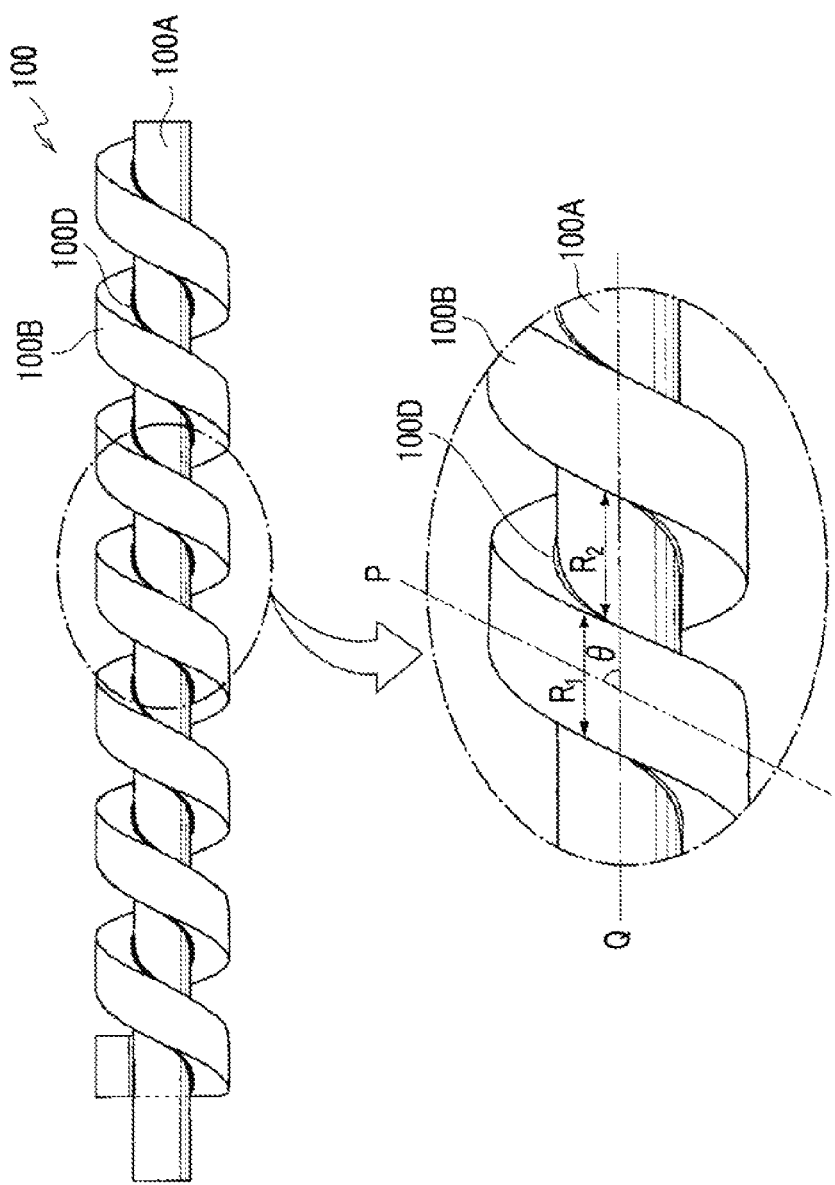
FIG. 5 is a schematic plan diagram illustrating the cleaning member according to the present exemplary embodiment.

FIG. 4 is a schematic perspective diagram illustrating a cleaning member 100 according to the present exemplary embodiment; FIG. 5 is a schematic plan diagram of the cleaning member 100 according to the present exemplary embodiment.

As illustrated in FIGS. 4 and 5, the cleaning member 100 according to the present exemplary embodiment is provided with a core 100A, a foam elastic layer 100B, and an adhesive layer 100D. The core 100A is a roll-shaped member and is an example of a shaft portion, and the adhesive layer 100D is for adhering the core 100A to the foam elastic layer 100B.

As illustrated in FIG. 3, in the cleaning member 100, the foam elastic layer 100B makes contact with the charging member 14 on the opposite side of the charging member 14 from the photoreceptor 12. Specifically, the cleaning member 100 is pushed toward the charging member 14 by applying the load F' to both ends of the core 100A, and the foam elastic layer 100B is subjected to elastic deformation along the circumferential surface of the charging member 14 to form a nip portion.

The cleaning member 100 follows the rotation of the charging member 14 and rotates in the arrow Z direction. Note that, the configuration is not limited to a case in which the cleaning member 100 is always in contact with the charging member 14, and a configuration may be adopted in which the cleaning member 100 is caused to make contact with the charging member 14 and be driven to rotate only during the cleaning of the charging member 14. It is permissible to adopt a configuration in which the cleaning member 100 makes contact with the charging member 14 only during the cleaning thereof, and the cleaning member 100 is caused to rotate with a peripheral speed difference from the charging member 14 using separate driving.

Core 100A

Examples of the material used for the core 100A include a metal (for example, free-cutting steel, stainless steel, or the like), or a resin (for example, a polyacetal resin (POM) or the like). Note that, it is desirable to select the material, the surface treatment method, and the like as necessary.

In particular, when the core 100A is formed of a metal, it is desirable to subject the core 100A to a plating process. When the core 100A is a non-conductivs material such as resin, the core 100A may be treated using a general treatment such as a plating process to render the core 100A conductive, and may be used as it is.

Adhesive Layer 100D

There are no particular limits to the adhesive layer 100D as long as the adhesive layer 100D is capable of adhering the core 100A to the foam elastic layer 100B; however, the adhesive layer 100D is formed of double sided tape or another adhesive, for example.

Foam Elastic Layer 100B

The foam elastic layer 100B is formed of a material with bubbles (a so-called foam member). The specific material of the foam elastic layer 100B will be described later.

Figure 11:
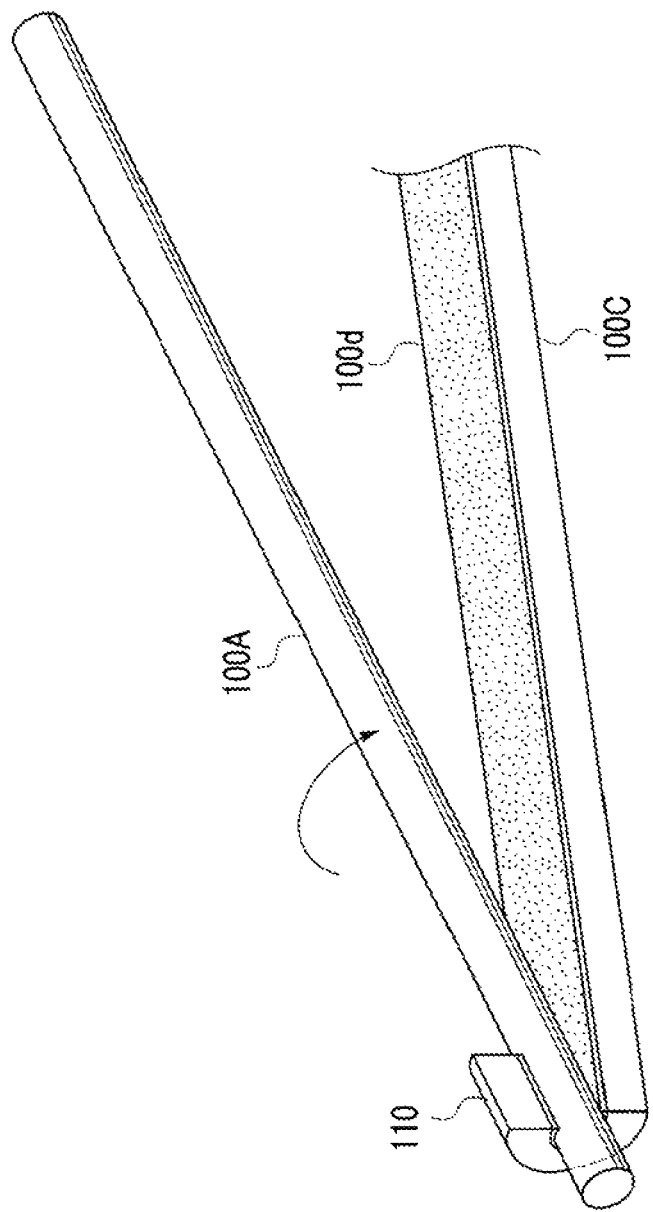
FIG. 11 is a process diagram illustrating a process in an example of the manufacturing method of the cleaning member according to the present exemplary embodiment.
Figure 12:
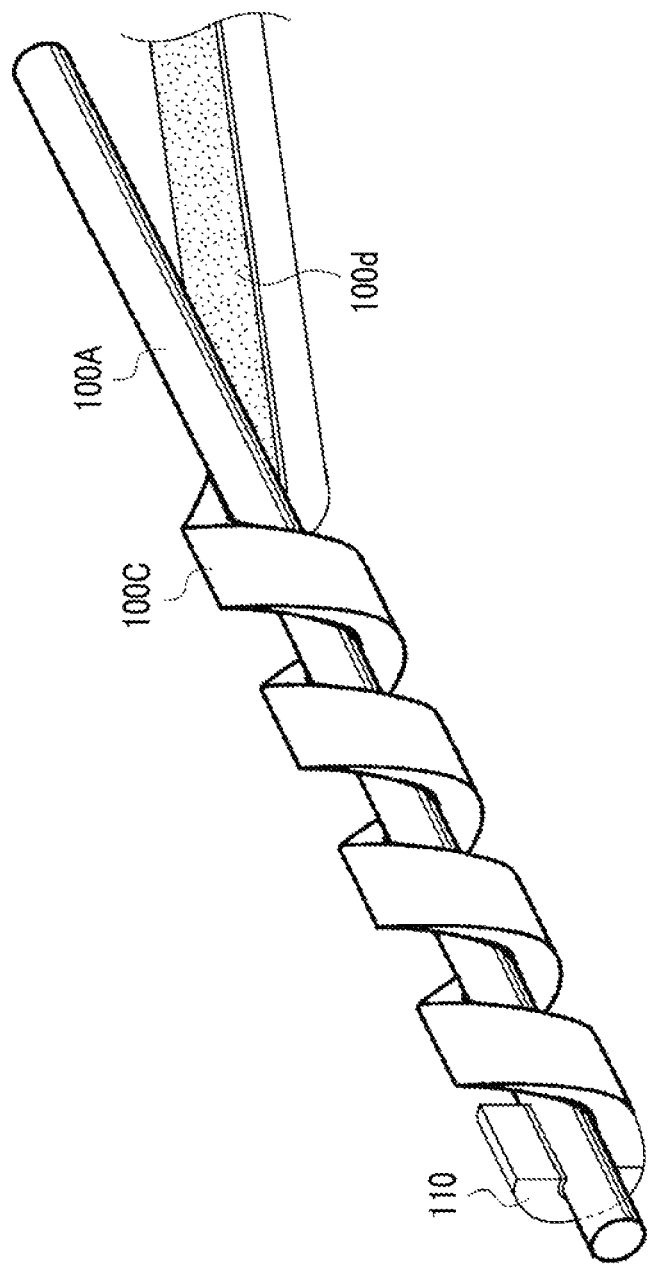
FIG. 12 is a process diagram illustrating a process in an example of the manufacturing method of the cleaning member according to the present exemplary embodiment.

As illustrated in FIGS. 4 and 5, the foam elastic layer 100B is disposed helically on the outer circumferential surface of the core 100A from the side of one end in the axial direction to the side of the other end in the axial direction of the core 100A. Specifically, as illustrated in FIGS. 10 to 12, the foam elastic layer 100B is formed, for example, by a strip-shaped foam elastic member 100C (hereinafter, there are cases in which the foam elastic member 100C is referred to as the strip 100C), which is wound in a helical shape with an interval around the core 100A from one end in the axial direction to the other end in the axial direction of the core 100A, using the core 100A as the helical axis.

Figure 6:
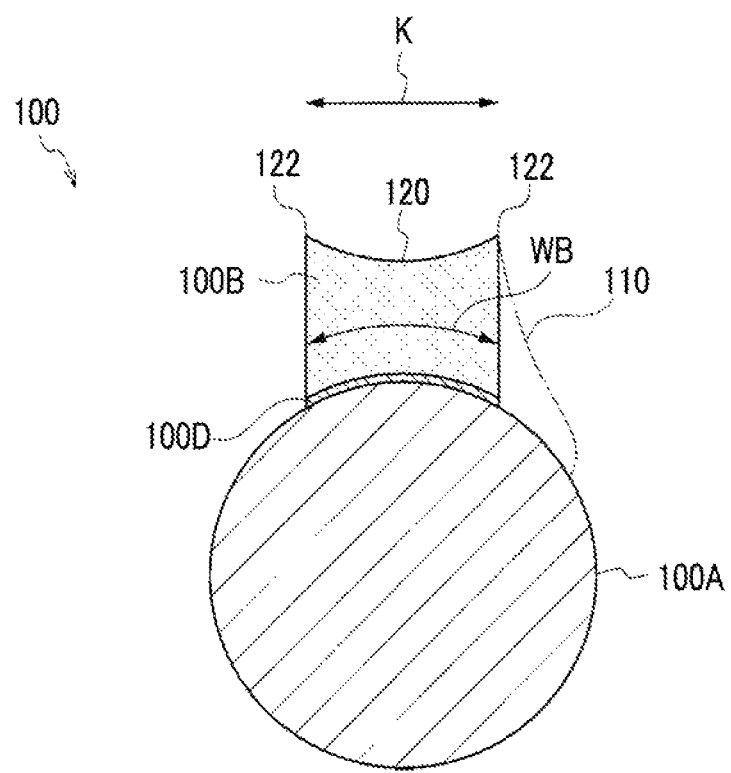
FIG. 6 is a schematic sectional diagram illustrating the cleaning member according to the present exemplary embodiment as viewed from an axial direction.

As illustrated in FIG. 6, as viewed from the axial direction of the core 100A, the foam elastic layer 100B has a quadrilateral shaped cross section, surrounded by four sides (including curves), and includes a protruding portion 122 on each end portion in the width direction (a K direction) of the foam elastic layer 100B, the protruding portions 122 protruding more to the outside in the radial direction of the core 100A than a center portion 120. The protruding portions 122 are formed along the length direction of the foam elastic layer 100B.

For example, the protruding portions 122 are formed due to an outer diameter difference between the center portion 120 in the width direction and both end portions 122 in the width direction of the outer circumferential surface of the foam elastic layer 100B, the outer diameter difference being generated by applying a tensile force to the foam elastic layer 100B in the longitudinal direction thereof.

Figure 7A:
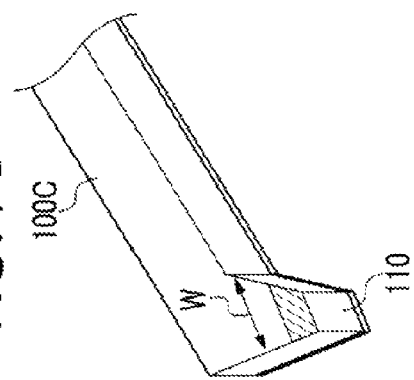
FIGS. 7A to 7D are schematic perspective diagrams illustrating an end portion in a longitudinal direction of a strip according to the present exemplary embodiment.

In the present exemplary embodiment, as illustrated in FIG. 7A, the strip 100C is formed such that both end portions (in FIGS. 7A to 7D, only one end portion is depicted) in the longitudinal direction (an A direction) of the strip 100C are wider in the width direction (a B direction) than a portion on the middle side of the strip 100C in the longitudinal direction, the width direction orthogonally intersecting the longitudinal direction. Specifically, the strip 100C illustrated in FIG. 7A includes an overhang portion 110 (a protruding portion) which overhangs to one side in the short direction at the end portion in the longitudinal direction of the strip 100C. Note that, a width W (the width in a direction which orthogonally intersects an overhang direction D) of the overhang portion 110 is set to a fixed width in the overhang direction D.

The strip 100C is subjected to a compression process in the thickness direction at the distal end aide in the overhang direction D of the overhang portion 110. Specifically, the overhang portion 110 of the strip 100C prior to being adhered to the core 100A is subjected to the compression process (a heat compression process) by applying heat and pressure to the overhang portion 110 in the thickness direction such that the compression rate (post-compression thickness/pre-compression thickness×100) is from 10% to 70%. By being subjected to the compression process, the portion of the strip 100C which is compressed plastically deforms to a compressed state (a crushed state). The portion which is subjected to the compression process is in a state in which the bubbles of the inner portion thereof are crushed. Note that, the portion of the strip 100C which is subjected to the compression process is, for example, the portion shaded with diagonal lines in FIG. 7A.

Figure 8A:
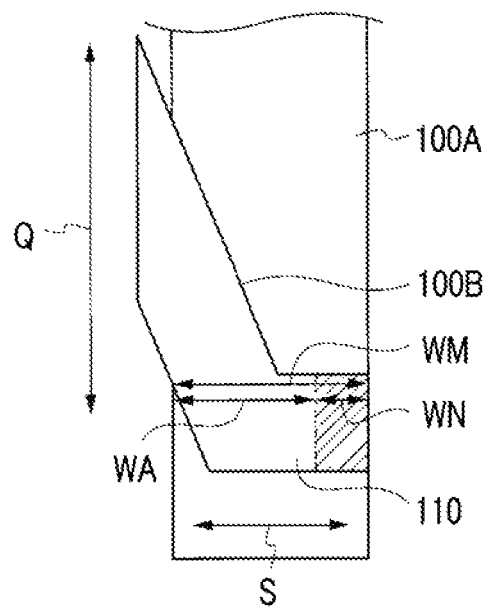
FIG. 8A is a schematic plan diagram schematically illustrating an end portion in an axial direction of a core according to the present exemplary embodiment.

As illustrated in FIG. 8A, by winding the strip 100C described earlier around the core 100A to dispose the strip 100C helically on the core 100A, the overhang portion 110 overhangs to one side in the circumferential direction (an S direction) of the core 100A at the end portion in the axial direction of the core 100A.

Accordingly, the foam elastic layer 100B in the state of being disposed on the core 100A assumes a configuration in which a portion of the core 100A in the circumferential direction (the S direction) of the core 100A at each end portion in the axial direction of the core 100A is subjected to the compression process in the radial direction of the core 100A.

The foam elastic layer 100B is configured such that the circumferential direction coverage width of the non-compressed region in the portions of the foam elastic layer 100B at both end portions of the core 100A in the axial direction which are subjected to the compression process is wider than the circumferential direction coverage width of the foam elastic layer 100B at the center portion of the core 100A in the axial direction. Note that, the portion of the strip 100C which is subjected to the compression process is, for example, the portion shaded with diagonal lines in FIGS. 8A and 8B.

Figure 8B:
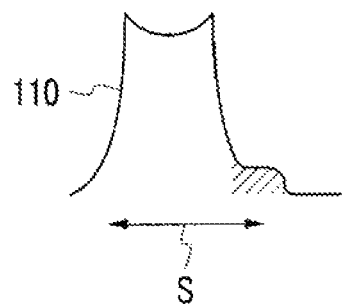
FIG. 8B is a schematic sectional diagram schematically illustrating an end portion of a foam elastic layer according to the present exemplary embodiment as viewed from an axial direction.
Figure 8C:
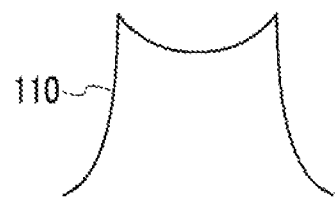
FIG. 8C is a schematic sectional diagram schematically illustrating the end portion of the foam elastic layer as viewed from the axial direction in a state in which the foam elastic layer is not subjected to a compression process.

Here, the expression "the circumferential direction coverage width of the non-compressed region at both end portions of the core 100A in the axial direction" is WA illustrated in FIGS. 8A to 8C, and is the maximum value of the circumferential direction coverage width, excluding the portion which is subjected to the compression process, at the end portion of the foam elastic layer 100B which is subjected to the compression process in the axial direction of the core 100A. The expression "the circumferential direction coverage width at the center portion of the core 100A in the axial direction" is WB in FIG. 6, and is the maximum value of the circumferential direction coverage width at the portion of the foam elastic layer 100B which is not subjected to the compression process at the center side in the axial direction in relation to the end portion of the foam elastic layer 100B which is subjected to the compression process in the axial direction of the core 100A. The expression "the circumferential direction coverage width" is the width of the foam elastic layer 100B which covers the outer circumferential surface of the core 100A in the circumferential direction of the core 100A.

Specifically, the ratio of the circumferential direction coverage width of the non-compressed region at the end portion in the axial direction to the circumferential direction coverage width at the center portion in the axial direction of the core 100A is set as 1.1 or greater. The ratio is desirably set as 1.6 or greater, and more desirably set as 2.0 or greater.

Figure 7B:
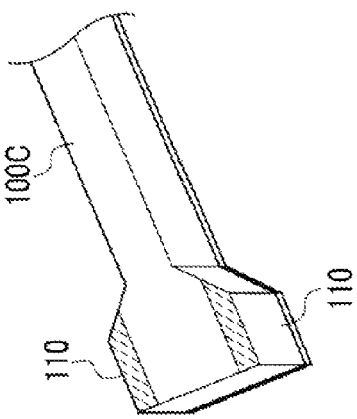
Figure 7C:
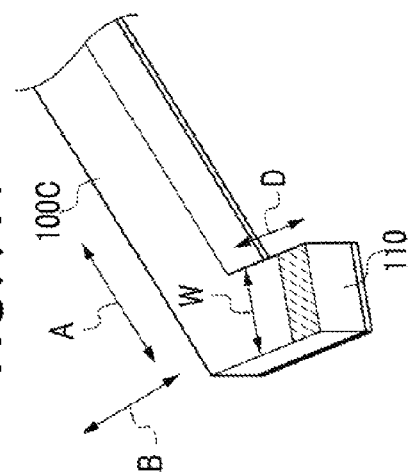
Figure 7D:
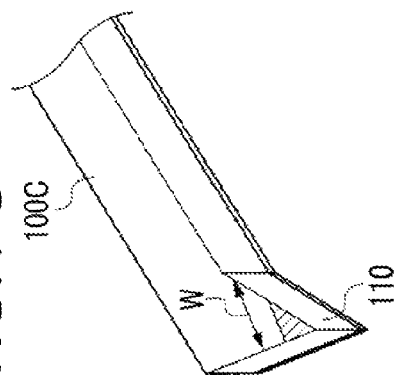

Note that, the strip 100C may be the strip 100C illustrated in FIG. 7B, 7C, or 7D. Each strip 100C illustrated in FIGS. 7B and 7C includes the overhang portion 110 (the protruding portion) which overhangs to one side in the short direction at the end portion in the longitudinal direction of the strip 100C. Note that, in the strip 100C illustrated in FIG. 7B, the width W of the overhang portion 110 slowly tapers toward the distal end side in the overhang direction. In the strip 100C illustrated in FIG. 7C, the width W of the overhang portion 110 slowly tapers toward the distal end side in the overhang direction, and the distal end in the overhang direction is formed at a sharp angle.

The strip 100C illustrated in FIG. 7D includes the overhang portion 110 (the protruding portion) which overhangs to both sides in the short direction at the end portion in the longitudinal direction of the strip 100C. The strips 100C illustrated in FIGS. 7B to 7D are also subjected to a compression process in the thickness direction at the distal end side in the overhang direction D of the overhang portion 110. Note that, the portion of the strip 100C which is subjected to the compression process is, for example, the portion shaded with diagonal lines in FIGS. 7B to 7D.

Note that, it is desirable that the width W of the distal end of the overhang portion 110 in a direction which orthogonally intersects the overhang direction D to be 4 mm or greater.

Material of Foam Elastic Layer 100B and the Like

Examples of the material of the foam elastic layer 100B include a foam resin such as polyurethane, polyethylene, polyamide, or polypropylene, or a material formed by blending one type, or two or more types of rubber material such as silicone rubber, fluororubber, urethane rubber, EPDM, NBR, CR, chlorinated polyisoprene, isoprene, acrylonitrile-butadiene rubber, styrene-butadiene rubber, hydragenated polybutadiene, and butyl rubber.

Note that, an auxiliary such as a foaming assistant, a foam stabilizer, a catalyst, a curing agent, a plasticizer, or a vulcanization accelerator may be added as necessary.

In particular, it is desirable for the foam elastic layer 100B to be foam polyurethane which is strong in relation to pulling, from the perspective of not scratching the surface of a cleaned member (the charging member 14) caused by rubbing, and ensuring that ripping and damage do not occur over a long period.

Examples of the polyurethane include reactants of polyol (for example, polyester polyol, polyether polyester, acrylic polyols, and the like), and isocyanate (for example, 2,4-tolylene diisocyanate, 2,6-tolylene diisocyanate and 4,4-diphenylmethane diisocyanate, tolidine diisocyanate, 1,6-hexamethylene diisocyanate, and the like). The polyurethane may also include a chain extender (1,4-butanediol or trimethylolpropane).

The foaming of the polyurethane is generally performed using a foaming agent such as water or an azo compound (for example, azodicarbonamide, azobisisobutyronitrile, or the like).

An auxiliary such as a foaming assistant, a foam stabilizer, or a catalyst may be added to the foam polyurethane, as necessary.

Among these foam polyurethares, an ether-based foam polyurethane is preferable. This is because the ester-based foam polyurethane has a tendency to easily age hygrothermally. Although a silicone oil foam stabilizer is usually used for the ether-based polyurethane, there is a case in which image quality defects arise due to the silicone oil transferring to the cleaned member (the charging member 14) during storage (in particular, long-term storage in highly hygrothermal conditions). Therefore, the image quality defects of the foam elastic layer 100B are suppressed by using a foam stabilizer other than silicone oil.

Here, specific examples of a foam stabilizer other than silicone oil include organic surfactants (for example, anionic surfactants such as dodecyl benzene sulfonic acid, and sodium lauryl sulfate) which do not contain Si.

A method which does not use a siiicone-based foam stabilizer may be applied by selecting a polyetherpolyol having a primary hydrogen group as a terminal group thereof and a molecular weight distribution of 1.02 to 1.2 as one of the polyols.

Note that, whether or not an ester-based foam polyurethane uses a foam stabilizer other than silicone oil is determined on whether or not "Si" is contained using component analysis.

The thickness (the thickness at the center portion in the width direction) of the foam elastic layer 100B may be, for example, from 1.0 mm to 3.0 mm, is desirably from 1.4 mm to 2.6 mm, and is more desirably from 1.6 mm to 2.4 mm.

Note that, the thickness of the foam elastic layer 100B is measured as described next, for example.

Measurement of the profile of the thickness of the foam elastic member 100C is performed using a laser measuring instrument (a laser scan micrometer manufactured by Mitutoyo Corporation, model number: LSM-6200) to scan in the longitudinal direction (the width direction) of the cleaning member 100 at a traversal velocity of 1 mm/s in a state in which the circumferential direction of the cleaning member 100 is fixed. Subsequently, the position in the circumferential direction is shifted and the same measurement is performed (the positions in the circumferential direction are at three locations at a 120° interval). The thickness of the foam elastic layer 100B is calculated based on the profile.

The foam elastic layer 100B is disposed helically; specifically, for example, the helix angle θ may be from 4° to 65° (is desirably from 7° to 65°, more desirably from 10° to 50°), and a helix width R1 may be from 3 mm to 25 mm (is desirably from 3 mm to 10 mm). A helix pitch R2 may be, for example, from 3 mm to 25 mm (is desirably from 15 mm to 22 mm, refer to FIG. 5).

The coverage ratio (helix width R1 of the foam elastic layer 100B/[helix width R1 of the foam elastic layer 100B+helix pitch R2 of the foam elastic layer 100B]: (R1/(R1+R2)) of the foam elastic layer 100B may be from 20% to 70%, and is desirably from 25% to 55%.

When the coverage ratio is greater than the range described above, since the time that the foam elastic layer 100B is in contact with the cleaned member is increased, the tendency increases for adhered matter which adheres to the surface of the cleaning member to dirty the cleaned member again. Meanwhile, when the coverage ratio is less than the range described above, the thickness of the foam elastic layer 100B is not easily stabilized, and there is a tendency for the cleaning capability to be reduced.

Note that, the term "the helix angle θ" means the angle (the acute angle) at which a longitudinal direction P (the helical direction) of the foam elastic layer 100B intersects an axial direction Q (the core axial direction) of the core 100A (refer to FIG. 5).

The term "the helix width R1" means the length of the foam elastic layer 100B along the axial direction Q (the core axial direction) of the cleaning member 100.

The term "the helix pitch R2" means the length of the foam elastic layer 100B along the axial direction Q (the core axial direction) of the cleaning member 100 between adjacent portions of the foam elastic layer 100B.

The term "the foam elastic layer 100B" refers to a layer which is formed of a material which restores the original shape even if the layer deforms due to the application of an external force of 100 Pa.

Manufacturing Method of Cleaning Member 100

Next, description will be given of the manufacturing method of the cleaning member 100 according to the present exemplary embodiment.

FIGS. 10 to 12 are process diagrams illustrating processes in an example of the manufacturing method of the cleaning member 100 according to the present exemplary embodiment.

First, as illustrated in FIG. 10, a sheet-shaped foam elastic member (a foam polyurethane sheet or the like) which is sliced to a target thickness is prepared, the member is cut out using a cutter mold, and a sheet of the target width and length is obtained. Note that, as described earlier, the strip 100C includes the overhang portion 110, and is subjected to a compression process in the thickness direction at the distal end side in the overhang direction D of the overhang portion 110.

A double sided tape 100d that is an example of the adhesive layer 100D is bonded to one side of the sheet-shaped foam elastic member, and the strip 100C (the strip-shaped foam elastic member 100C with the double sided tape 100d) of the target width and length is obtained.

Next, as illustrated in FIG. 11, the strip 100C is disposed with the surface thereof to which the double sided tape 100d is attached facing upward, and in this state, separation paper of one end of the double sided tape 100d is peeled off, and one end portion of the core 100A is placed on the double sided tape 100d from which the separation paper is peeled.

Next, as illustrated in FIG. 12, the core 100A is rotated at a target speed while peeling the separation paper of the double sided tape 100d, the strip 100C is wound onto the outer circumferential surface of the core 100A in a helical shape, and the cleaning member 100 which includes the elastic layer 100B which is helically disposed on the outer circumferential surface of the core 100A is obtained.

Here, when winding the strip 100C which becomes the foam elastic layer 100B onto the core 100A, the position of the strip 100C may be aligned such that the longitudinal direction of the strip 100C is a target angle (helix angle) in relation to the axial direction of the core 100A. The outer diameter of the core 100A may be set as, for example, φ 3 mm to φ 6 mm.

The tensile force which is applied when winding the strip 100C onto the core 100A may be of a degree at which a gap is not formed between the core 100A and the double sided tape 100d of the strip 100C, and it is preferable not to apply excessive tensile force. This is because, if too much tensile force is applied, there is a tendency for the tensile permanent stretching to become great, and the elasticity of the foam elastic layer 100B is reduced, the elasticity being necessary for the cleaning. Specifically, for example, the tensile force may be set such that the stretching in relation to the original length of the strip 100C exceeds 0% and is equal to or less than 5%.

Meanwhile, when the strip 100C is wound onto the core 100A, there is a tendency for the strip 100C to stretch. The stretching differs in the thickness direction of the strip 100C, there is a tendency for the extremities to stretch the most, and there is a case in which the elasticity is reduced. Therefore, the stretching of the extremities of the strip 100C after the strip 100C is wound onto the core 100A may be approximately 5% in relation to the original extremities of the strip 100C.

This stretching is controlled by the radius of the curvature at which the strip 100C is wound onto the core 100A and the thickness of the strip 100C, and the radius of the curvature at which the strip 100C is wound onto the core 100A is controlled by the outer diameter of the core 100A and the winding angle (helix angle θ) of the strip 100C.

For example, this radius of the curvature at which the strip 100C is wound onto the core 100A may be set as from ((core outer diameter/2)+0.2 mm) to ((core outer diameter/2)+8.5 mm), and is desirably from ((core outer diameter/2)+0.5 mm) to ((core outer diameter/2)+7.0 mm).

For example, the thickness of the strip 100C may be from 1.5 mm to 4 mm, and is desirably from 1.5 mm to 3.0 mm. The width of the strip 100C may be adjusted such that the coverage ratio of the foam elastic layer 100B falls within the range described above. For example, the length of the strip 100C is determined using the length of the strip 100C in the axial direction of the region which is wound onto the core 100A, the winding angle (the helix angle θ), and the tensile force during the winding.

Operations of Present Exemplary Embodiment

Next, description will be given of the operations of the present exemplary embodiment.

In the present exemplary embodiment, foreign matter such as the developer which is not transferred to the recording medium 24 but remains on the photoreceptor 12 is removed from the photoreceptor 12 by the cleaning blade 80. The foreign matter such as a portion of the developer which is not removed by the cleaning blade 80 but slips past the cleaning blade 80 adheres to the surface of the charging member 14 (refer to FIG. 1).

The foreign matter which is adhered to the surface of the charging member 14 is removed due to the protruding portion 122 and the outer circumferential surface (the top surface in FIG. 6) of the foam elastic layer 100B coming into contact with the charging member 14, the outer circumferential surface of the foam elastic layer 100B wiping the outer circumferential surface of the charging member 14, and the protruding portion 122 of the foam elastic layer 100B scraping the foreign matter.

Here, when the strip 100C is wound onto the outer circumferential surface of the core 100A, a predetermined tensile force is applied in the longitudinal direction (the winding direction) and the strip 100C is disposed in an elastically deformed state. Therefore, a restoring force corresponding to the elastic deformation amount of the foam elastic layer 100B arises. Since the restoring force acts in the direction in which the foam elastic layer 100B contracts, that is, since the restoring force acts in a direction parallel to the longitudinal direction of the foam elastic layer 100B (the winding direction of the strip 100C), both end portions of the foam elastic layer 100B in the longitudinal direction act in the direction of peeling from the core 100A on the outer circumferential surface of the core 100A. This restoring force acts stronger the smaller the thickness and elasticity coefficient of the foam elastic layer 100B, and the smaller the radius of the curvature of the core 100A, and the foam elastic layer 100B peels off more easily.

Conversely, as illustrated in FIG. 8A, in the cleaning member 100 of the present exemplary embodiment, a portion of the foam elastic layer 100B in the circumferential direction (the S direction) at both end portions in the axial direction of the core 100A is subjected to a compression process in the radial direction of the core 100A. Therefore, in comparison to a case in which the compression process is not performed, the thickness of the foam elastic layer 100B at both end portions in the axial direction of the core 100A is thin, and the elasticity coefficient is also small. Therefore, in comparison to a case in which the compression process is not performed, the restoring force which acts on the foam elastic layer 100B at both end portions in the axial direction of the core 100A is small, and the peeling of the foam elastic layer 100B at the end portions in the axial direction of the core 100A is suppressed.

In particular, in the present exemplary embodiment, the foam elastic layer 100B is subjected to the compression process at the distal end side in the overhang direction of the overhang portion 110. Therefore, the peeling of the foam elastic layer 100B from the distal end side of the overhang portion 110 is suppressed in comparison to a case in which the foam elastic layer 100B is subjected to the compression process at the base end side of the overhang portion 110 in the overhang direction.

In the cleaning member 100 of the present exemplary embodiment, the foam elastic layer 100B is configured such that the circumferential direction coverage width of the non-compressed region in the portions of the foam elastic layer 100B at both end portions of the core 100A in the axial direction which are subjected to the compression process is wider than the circumferential direction coverage width of the foam elastic layer 100B at the center portion of the core 100A in the axial direction.

Figure 9A:
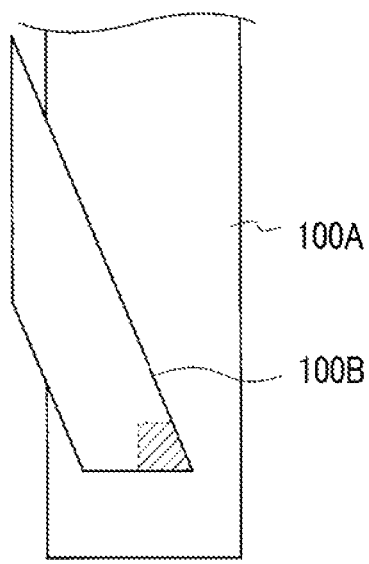
FIG. 9A is a schematic plan diagram schematically illustrating an end portion in an axial direction of a core according to a comparative example.
Figure 9B:
FIG. 9B is a schematic sectional diagram schematically illustrating an end portion of a foam elastic layer according to the comparative example as viewed from an axial direction.
Figure 9C:
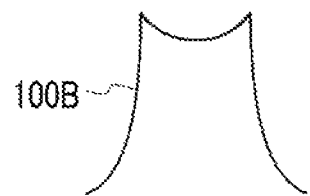
FIG. 9C is a schematic sectional diagram schematically illustrating the end portion of the foam elastic layer according to the comparative example as viewed from the axial direction in a state in which the foam elastic layer is not subjected to a compression process.

Therefore, as illustrated in FIG. 8B, even when a portion of the foam elastic layer 100B is crushed by being subjected to the compression process in the circumferential direction at both end portions in the axial direction of the core 100A, the foam elastic layer 100B maintains the state in which the protruding portion 122 is formed. In other words, as illustrated in FIG. 9A, in a case (a comparative example) in which the circumferential direction coverage width of the non-compressed region of the foam elastic layer 100B at both end portions in the axial direction of the core 100A which are subjected to the compression process is the same as the circumferential direction coverage width at the center portion in the axial direction of the core 100A, as illustrated in FIG. 9B, when a portion of the foam elastic layer 100B is crushed, there is a case in which the foam elastic layer 100B may not maintain the shape of the protruding portion 122. Note that, FIGS. 8C and 9C are sectional diagrams of cases in which the foam elastic layer 100B is not subjected to the compression process.

In this manner, in the present exemplary embodiment, since the state in which the protruding portion 122 is formed is maintained, the scraping capability of the protruding portion 122 to scrape the foreign matter is maintained, and the cleaning capability is maintained in comparison to a case in which the circumferential direction coverage width of the non-compressed region at both end portions in the axial direction of the core 100A is the same as the circumferential direction coverage width at the center portion in the axial direction of the core 100A.

As described above, according to the present exemplary embodiment, the cleaning capability at the end portions in the axial direction of the core 100A is maintained while suppressing the peeling of the foam elastic layer 100B at the end portions in the axial direction of the core 100A.

The foam elastic layer 100B is configured such that the circumferential direction coverage width of the non-compressed region in the portions of the foam elastic layer 100B at both end portions of the core 100A in the axial direction which are subjected to the compression process is wider than the circumferential direction coverage width of the foam elastic layer 100B at the center portion of the core 100A in the axial direction. Therefore, the contact area at the end portions in the axial direction of the core 100A per rotation in relation to the charging member 14 is wider than at the center portion in the axial direction.

In particular, since the cleaning member 100 is pushed into the charging member 14 with the load F' at both end portions in the axial direction of the core 100A, the friction force between the foam elastic layer 100B and the charging member 14 is secured at both end portions in the axial direction of the core 100A.

Accordingly, the driven rotation properties of the cleaning member 100 which is driven to rotate by the rotation of the charging member 14 is improved in comparison to a case in which the circumferential direction coverage width of the non-compressed regions at both end portions in the axial direction of the core 100A which is subjected to the compression process is the same as the circumferential direction coverage width at the center portion in the axial direction of the core 100A. Since the contact efficiency per unit time of the foam elastic layer 100B in relation to the charging member 14 is improved by the improvement in the driven rotation properties of the cleaning member 100, the cleaning properties for cleaning the charging member 14 are favorable.

In particular, when the ratio of the circumferential direction coverage width of the non-compressed region at the end portion in the axial direction to the circumferential direction coverage width at the center portion in the axial direction of the core 100A is set as 1.1 or greater, the driven rotation properties of the cleaning member 100 is improved, and the greater the ratio, the more the driven rotation properties of the cleaning member 100 are improved.

Modification Example

Figure 13:
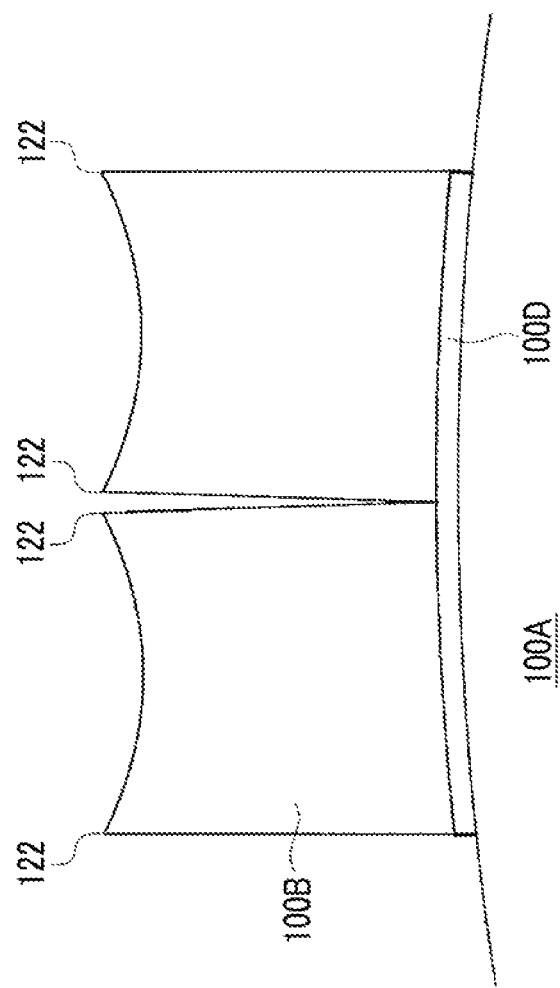
FIG. 13 is an enlarged sectional diagram illustrating a foam elastic layer in a cleaning member according to another exemplary embodiment.

The invention is not limited to an exemplary embodiment in which the foam elastic layer 100B is formed of one strip 100C. For example, as illustrated in FIGS. 13 and 14, the foam elastic layer 100B is formed of at least two or more of the strips 100C (the strip-shaped foam elastic members), and may be configured by two or more of the strips 100C being wound helically around the core 100A.

Figure 14:
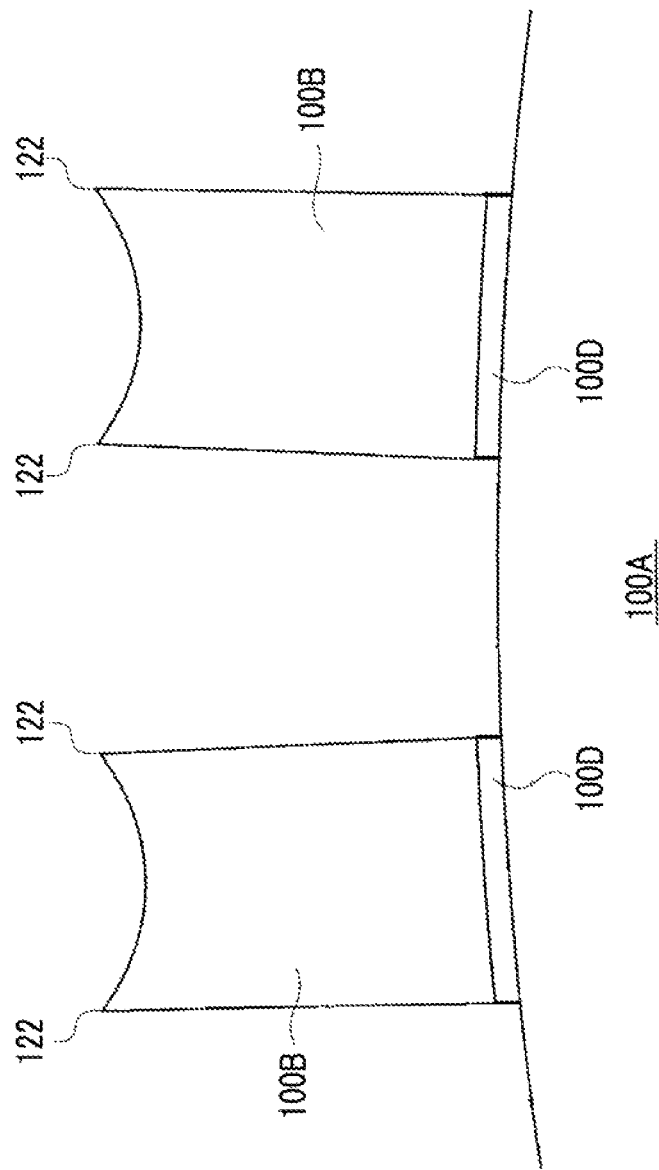
FIG. 14 is an enlarged sectional diagram illustrating the foam elastic layer in the cleaning member according to the other exemplary embodiment.

The foam elastic layer 100B which is configured by two or more of the strips 100C (the strip-shaped foam elastic members) being wound helically around the core 100A may adopt a configuration in which the strips 100C are wound helically around the core 100A in a state in which the sides in the longitudinal direction of the adhesive surfaces (the surfaces of the sides of the strips 100C facing the outer circumferential surface of the core 100A) of the strips 100C are in contact with each other (refer to FIG. 13), and the foam elastic layer 100B may adopt a configuration in which the strips 100C are wound helically around the core 100A in a state in which the sides in the longitudinal direction of the adhesive surfaces of the strips 100C are not in contact with each other (refer to FIG. 14).

Figure 15:
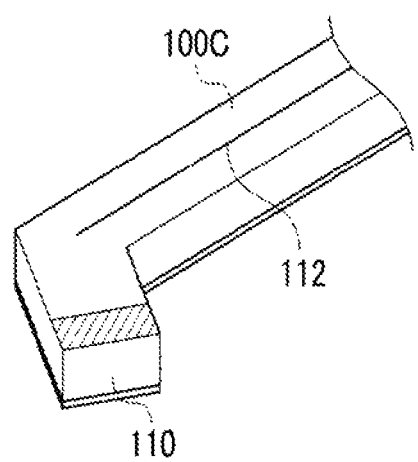
FIG. 15 is a schematic perspective diagram illustrating an end portion in a longitudinal direction of a strip in the cleaning member according to the other exemplary embodiment.

Note that, the configuration which uses the strip 100C illustrated in FIG. 15 may be adopted for the configuration in which the strips 100C are wound helically around the core 100A in a state in which the sides in the longitudinal direction of the adhesive surfaces of the strips 100C are in contact with each other. The strip 100C illustrated in FIG. 15 includes the overhang portion 110 (the protruding portion) which overhangs to one side in the short direction at the end portion in the longitudinal direction of the strip 100C. The width W of the overhang portion 110 is set to a fixed width in the overhang direction. A slit 112 which is parallel to the longitudinal direction is formed in the center portion in the short direction of the strip 100C.

In this manner, when the foam elastic layer 100B is configured by helically winding two or more of the strips 100C around the core 100A, the number of the protruding portions 122 increases, and the scraping capability of the protruding portions 122 to scrape the foreign matter is improved. Therefore, the cleaning capability of the cleaning member 100 is improved.

In particular, for example, when the foam elastic layer 100B is disposed such that the strips 100C are wound helically around the core 100A in a state in which the sides in the longitudinal direction of the adhesive surfaces of the two strips 100C are in contact with each other (refer to FIG. 13), it is considered that it becomes easier to obtain more excellent cleaning capability due to the high contact pressure which is applied to the cleaned member in comparison to a case in which one foam elastic member is used with the same helix width R1.

In this manner, the cleaning capability of the cleaning member 100 is improved by applying the foam elastic layer 100B which is formed of two or more elastic layers which are arranged in parallel in a helical shape.

Another Modification Example

In the present exemplary embodiment, the foam elastic layer 100B is subjected to the compression process at both end portions in the axial direction of the core 100A in the radial direction of the core 100A; however, the configuration is not limited thereto. For example, the foam elastic layer 100B may be subjected to the compression process at one end portion in the axial direction of the core 100A in the radial direction of the core 100A. In other words, the foam elastic layer 100B may be subjected to the compression process at at least one end portion or the other end portion in the axial direction of the core 100A in the radial direction of the core 100A.

In the present exemplary embodiment, the foam elastic layer 100B is configured such that the circumferential direction coverage width of the non-compressed region in the portions of the foam elastic layer 100B at both end portions of the core 100A in the axial direction which are subjected to the compression process is wider than the circumferential direction coverage width of the foam elastic layer 100B at the center portion of the core 100A in the axial direction; however, the invention is not limited thereto. When the foam elastic layer 100B is subjected to the compression process at the portion of one end of the core 100A in the axial direction in the radial direction of the core 100A, in the portion of one end in the axial direction which is subjected to the compression process, the circumferential direction coverage width of the non-compressed region may be wider than the circumferential direction coverage width at the center portion in the axial direction.

In the image forming apparatus 10 according to the present exemplary embodiment, an exemplary embodiment is described in which the charging device 11 is configured of a unit of the charging member 14 and the cleaning member 100, that is, an exemplary embodiment is described in which the charging member 14 is adopted as the cleaned member; however, the invention is not limited thereto. For example, examples of the cleaned member include a photoreceptor (an image holding member), a transfer device (a transfer member or a transfer roll), and an intermediate transfer body (an intermediate transfer belt). The unit of the cleaned member and the cleaning member which is disposed to be in contact with the cleaned member may be directly disposed in the image forming apparatus, and, as described above, a cartridge such as the process cartridge may be created using the unit and disposed in the image forming apparatus.

The invention is not limited to the exemplary embodiments described above, and it is possible to carry out various physical modifications, changes, and improvements within a range that does not depart from the gist of the invention. For example, a configuration may be adopted in which of the modification examples described above, plural modification examples are suitably combined.

EXAMPLES

Hereinafter, description will be given of specific examples of the invention; however, the invention is not limited to these examples.

Example 1

Creation of Cleaning Roll 1

A sheet of foam urethane (EP-70, manufactured by INOAC Corporation) with a thickness of 3.0 mm is cut out so as to form a strip with a width of 3 mm and a length of 230 mm, and including the square overhang portion 110 (width W (width along axial direction of core 100A) at base 3 mm, at tip 3 mm, total width in circumferential direction (maximum value of WM of FIG. 8A) 6 mm) illustrated in FIG. 7A on both end portions thereof. A double sided tape (No. 5605 manufactured by Nitto Denko Corporation) with a thickness of 0.05 mm is bonded to the strip which is cut out over the total surface of the strip, and the strip with double sided tape is obtained.

The obtained strip is placed on a horizontal stand such that the separation paper which is bonded to the double sided tape faces downward, and the overhang portion 110 is compressed (end portion compressed region width (WM in FIG. 8A) of 1 mm) such that the thickness of the region of the distal end circumferential width of 1 mm of the square overhang portion 110 of the strip (the strip formed of foam polyurethane, excluding the double sided tape) becomes 15%. As a result, the circumferential direction coverage width (an end portion non-compressed region width WA (WM−WN)) of the non-compressed region at the end portion in the axial direction of the core 100A becomes 5 mm. The ratio (the circumferential coverage ratio) of the end portion non-compressed region width to the circumferential direction coverage width at the center portion in the axial direction of the core 100A is set as 1.67.

The obtained strip with double sided tape is placed on a horizontal stand such that the separation paper which is bonded to the double sided tape faces downward, the strip is wound onto a metal core (material=SUM24EZ, outer diameter=ϕ 4.0 mm, total length=236 mm) such that the helix angle θ becomes 7° (wind count=2), and the helically disposed foam elastic layer is obtained by winding the strip onto the core while applying a tensile force such that the total length of the strip stretches approximately from 0% to 5%.

Example 2

Creation of Cleaning Roll 2

The cleaning roll 2 (end portion non-compressed region width of 4 mm, circumferential direction coverage ratio of 1.33) is obtained in the same manner as the cleaning roll 1 except in that the total width of the overhang portion 110 in the circumferential direction is set as 5 mm.

Example 3

Creation of Cleaning Roll 3

The cleaning roll 3 (end portion non-compressed region width of 6 mm, circumferential direction coverage ratio of 2.00) is obtained in the same manner as the cleaning roll 1 except in that the total width of the overhang portion 110 in the circumferential direction is set as 7 mm.

Example 4

Creation of Cleaning Roll 4

The cleaning roll 4 (end portion non-compressed region width of 7 mm, circumferential direction coverage ratio of 2.33) is obtained in the same manner as the cleaning roll 1 except in that the total width of the protrusion shape in the circumferential direction is set as 8 mm.

Example 5

Creation of Cleaning Roll 5

The cleaning roll 5 (end portion non-compressed region width of 5 mm, circumferential direction coverage ratio of 1.67) is obtained in the same manner as the cleaning roll 1 except in that the helix angle θ at which the strip with double sided tape is wound onto the core is set as 4° (wind count=1).

Example 6

Creation of Cleaning Roll 6

The cleaning roll 6 (end portion non-compressed region width of 5 mm, circumferential direction coverage ratio of 1.67) is obtained in the same manner as the cleaning roll 1 except in that the helix angle θ at which the strip with double sided tape is wound onto the core is set as 10° (wind count=3).

Example 7

Creation of Cleaning Roll 7

The cleaning roll 7 (end portion non-compressed region width of 4 mm, circumferential direction coverage ratio of 1.33) is obtained in the same manner as the cleaning roll 1 except in that the width of the distal end of the overhang portion 110 in the circumferential direction is compressed to 2 mm (an end portion compressed region width of 2 mm).

Example 8

Creation of Cleaning Roll 8

The cleaning roll 8 (end portion non-compressed region width of 3.5 mm, circumferential direction coverage ratio of 1.17) is obtained in the same manner as the cleaning roll 1 except in that the width of the distal end of the overhang portion 110 in the circumferential direction is compressed to 2.5 mm (an end portion compressed region width of 2.5 mm).

Example 9

Creation of Cleaning Roll 9
The cleaning roll 9 (end portion non-compressed region width of 5 mm, circumferential direction coverage ratio of 1.67) is obtained in the same manner as the cleaning roll 1 except in that the sheet is cut out so as to obtain a strip including the triangular overhang portion 110 (width W at base 3 mm, at distal end 0 mm, and total width in circumferential direction of 6 mm) illustrated in FIG. 7C on both end portions.

Example 10

Creation of Cleaning Roll 10
The cleaning roll 10 (end portion non-compressed region width of 5 mm, circumferential direction coverage ratio of 1.25) is obtained in the same manner as the cleaning roll 1 except in that the sheet is cut out to form a strip with a width of 4 mm.

Example 11

Creation of Cleaning Roll 11
The cleaning roll 11 (end portion non-compressed region width of 7 mm, circumferential direction coverage ratio of 1.17) is obtained in the same manner as the cleaning roll 1 except in that the sheet is cut out to form a strip with a width of 6 mm, and the total width of the protrusion shape in the circumferential direction is set as 8 mm.

Example 12

Creation of Cleaning Roll 12
The cleaning roll 12 (end portion non-compressed region width of 7 mm, circumferential direction coverage ratio of 1.17) is obtained in the same manner as the cleaning roll 1 except in that the sheet is cut out to form two strips with a width of 3 mm each including the square overhang portion 110 as illustrated in FIG. 15 on both end portions, and the total width of the protrusion shape in the circumferential direction is set as 8 mm.

Example 13

Creation of Cleaning Roll 13
The cleaning roll 13 (end portion non-compressed region width of 5 mm, circumferential direction coverage ratio of 1.67) is obtained in the same manner as the cleaning roll 1 except in that the width W of the overhang portion 110 is set as 4 mm at the base and 4 mm at the distal end.

Example 14

Creation of Cleaning Roll 14
The cleaning roll 14 (end portion non-compressed region width of 5 mm, circumferential direction coverage ratio of 1.67) is obtained in the same manner aa the cleaning roll 1 except in that the width W of the overhang portion 110 is set as 5 mm at the base and 5 mm at the distal end.

Comparative Example 1

Creation of Comparative Cleaning Roll 1
The comparative cleaning roll 1 (end portion non-compressed region width of 2 mm, circumferential direction coverage ratio of 0.67) is obtained in the same manner as the cleaning roll 1 except in that the sheet is cut out to form a strip without the overhang portion 110 on either end portion.

Comparative Example 2

Creation of Comparative Cleaning Roll 2
The comparative cleaning roll 2 (end portion non-compressed region width of 3 mm, circumferential direction coverage ratio of 1.00) is obtained in the same manner as the cleaning roll 1 except in that the width of the distal end of the overhang portion 110 in the circumferential direction is compressed to 3 mm (an end portion compressed region width of 3 mm).

Comparative Example 3

Creation of Comparative Cleaning Roll 3
The comparative cleaning roll 3 (end portion non-compressed region width of 2 mm, circumferential direction coverage ratio of 0.67) is obtained in the same manner as the cleaning roll 1 except in that the width of the distal end of the protrusion shape in the circumferential direction is compressed to 4 mm (an end portion compressed region width of 4 mm).

Comparative Example 4

Creation of Comparative Cleaning Roll 4
The comparative cleaning roll 4 (end portion non-compressed region width of 4 mm, circumferential direction coverage ratio of 1.33) is obtained in the same manner as the cleaning roll 1 except in that the total width of the overhang portion 110 in the circumferential direction is set as 4 mm, and the distal end is not compressed (an end portion compressed region width of 0 mm)

Comparative Example 5

Creation of Comparative Cleaning Roll 5
The comparative cleaning roll 5 (end portion non-compressed region width of 6 mm, circumferential direction coverage ratio of 2.00) is obtained in the same manner as the cleaning roll 1 except in that the total width of the overhang portion 110 in the circumferential direction is set as 6 mm, and the distal end is not compressed (an end portion compressed region width of 0 mm).
Evaluation
Evaluation of the driven rotation properties, the cleaning properties, and the peeling is performed using the cleaning rolls created in each of the examples. Note that, the charging roll described below is used in the evaluation.
Creation of Charging Roll
Formation of Foam Elastic Layer
The mixture described below is mixed with an open roll, cylindrically covers the surface of a conductive support member formed of SUS 416 with a diameter of 6 mm such that the thickness is 3 mm, is inserted into a cylindrical mold with an internal diameter of 18.0 mm, is vulcanized at 170° C. for 30 minutes, is taken out from the mold, and subsequently, is polished to obtain a cylindrical conductive foam elastic layer A.

Rubber material—100 parts by weight
(Epichlorohydrin-ethylene oxide-allyl glycidyl ether copolymer rubber, Gechron 3106: manufactured by Zeon Corporation)
Conductive agent (carbon black Asahi Thermal: manufactured by Asahi Carbon Co., Ltd.)—25 parts by weight
Conductive agent (Ketjenblack EC: manufactured by Lion-Sha Corporation)—8 parts by weight
Ionic conductive agent (lithium perchlorate)—1 part by weight
Vulcanizing agent (sulfur, 200 mesh: manufactured by Tsurumi Chemical Industry Co., Ltd.)—1 part by weight
Vulcanization accelerator (Nocceler DM: manufactured by Ouchi Shinko Chemical Industry Co., Ltd.)—2.0 parts by weight
Vulcanization accelerator (Nocceler TT: manufactured by Ouchi Shinko Chemical Industry Co., Ltd.)—0.5 parts by weight
Formation of Surface Layer A dispersion liquid A, which is obtained by dispersing the mixture described below in a bead mill, is diluted with methanol, the result is applied to the surface of the conductive foam elastic layer A by immersion, and subsequently, is heat dried for 15 minutes at 140° C. to form the surface layer with a thickness of 4 μm and obtain a conductive roll. The conductive roll is the charging roll.

High polymer material—100 parts by weight
(copolymer nylon, Amilan CM8000: manufactured by Toray Industries, Inc.)
Conductive agent—30 parts by weight
(antimony-doped tin oxide, SN-100P: manufactured by Ishihara Sangyo Kaisha, Ltd.)
Solvent (methanol)—500 parts by weight
Solvent (butanol)—240 parts by weight
Evaluation of Driven Rotation Properties Together with the cleaning roll created in each example described above, the charging roll described above is mounted to the drum cartridge of the color printer DocuPrint P355d: manufactured by Fuji Xerox Co., Ltd., a drive with a rotational velocity of 1300 rpm is applied to the photosensitive drum using a rotating motor, and the driven rotation properties evaluation test of the cleaning roll is performed.

In the evaluation test, the rotational period of each of the charging rolls and the cleaning roll which are driven to rotate by the drive of the photosensitive drum is measured in an environment of 10° C. and 10 RH%, and the driven rotation properties are evaluated based on the following criteria.

Driven Rotation Properties Evaluation: Determination Criteria

G0: Ratio of rotational period of cleaning roll to rotational period of charging roll is greater than 95% and less than or equal to 100%

G0.5: Ratio of rotational period of cleaning roll to rotational period of changing roll is greater than 90% and less than or equal to 95%

G1: Ratio of rotational period of cleaning roll to rotational period of charging roll is greater than 80% and less than or equal to 90%

G2: Ratio of rotational period of cleaning roll to rotational period of charging roll is less than or equal to 80%

Cleaning Properties Evaluation (Cleaning Capability Evaluation)

Together with the cleaning roll created in each example described above, the charging roll described above is mounted to the color printer DocuPrint P355d: manufactured by Fuji Xerox Co., Ltd., and the cleaning properties evaluation test is performed.

In the evaluation test, after printing an image quality pattern with an average image density of 5% onto 10,000 sheets and 50,000 sheets of A4 paper in an environment of 30° C. and 75 RH%, a halftone image with a density of 50% is output, and density irregularity (the cleaning properties) caused by insufficient cleaning in relation to the charging roll is evaluated. Specifically, the image density of 10 random points in a range of 5 mm from both ends of the image printing region is measured using the X-rite 404 (manufactured by Videojet X-Rite K.K.), and the cleaning properties are evaluated based on the following criteria from the difference between the maximum value and the minimum value.

Cleaning Properties Evaluation: Determination Criteria

G0: Difference between maximum value and minimum value is less than or equal to 0.05

G1: Difference between maximum value and minimum value is greater than 0.05 and less than or equal to 0.10

G2: Difference between maximum value and minimum value is greater than 0.10 and less than or equal to 0.15

G3: Difference between maximum value and minimum value is greater than 0.15

Peeling Evaluation

The cleaning roll and the charging roll created in each example described above are mounted to the color printer DocuPrint P355d: manufactured by Fuji Xerox Co., Ltd., and after leaving the color printer for 10 days in a 40° C./55% environment, the evaluation of the peeling of the foam elastic layer of the cleaning roll is carried out based on the following criteria.

Note that, the state of the occurrence of peeling of the foam elastic layer of the cleaning roll which is determined in this evaluation indicates a state in which one end portion or both end portions of the foam elastic layer in the longitudinal direction are separated 1 mm or more from the metallic core.

Peeling Evaluation: Determination Criteria

G0: No Occurrence of Peeling

G1: Length of urethane in which peeling occurred is less than or equal to 5 mm

G2: Length of urethane in which peeling occurred is longer than 5 mm

It may be understood from the results illustrated in FIG. 16 that the present examples have favorable peeling evaluations and cleaning properties evaluations in comparison to the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning member, comprising:
   a shaft portion;
   a foam elastic layer that is disposed helically from one end side in an axial direction to the other end side in the axial direction on an outer circumferential surface of the shaft portion; and
   an adhesive layer that adheres the shaft portion to the foam elastic layer, wherein the foam elastic layer is subjected to a compression process in a radial direction of the shaft portion at a portion of a circumferential direction at an end portion in the axial direction of the shaft portion, and a circumferential direction coverage width of a non-compressed region at the end portion in the axial direction which is subjected to the compression process is wider than a circumferential direction coverage width at a center portion in the axial direction of the shaft portion.

2. The cleaning member according to claim 1,
wherein the foam elastic layer includes an overhang portion that overhangs in the circumferential direction of the shaft portion at the end portion in the axial direction of the shaft portion, and the overhang portion is subjected to the compression process at a distal end side in an overhang direction.

3. The cleaning member according to claim 1,
wherein a ratio (circumferential direction coverage width at an end portion non-compressed region/circumferential direction coverage width at a center portion in axial direction) of the circumferential direction coverage width at the end portion non-compressed region to the circumferential direction coverage width at the center portion in the axial direction is 1.1 or greater.

4. The cleaning member according to claim 1,
wherein a ratio (circumferential direction coverage width at an end portion non-compressed region/circumferential direction coverage width at a center portion in axial direction) of the circumferential direction coverage width at the end portion non-compressed region to the circumferential direction coverage width at the center portion in the axial direction is 1.6 or greater.

5. The cleaning member according to claim 1,
wherein a ratio (circumferential direction coverage width at an end portion non-compressed region/circumferential direction coverage width at a center portion in axial direction) of the circumferential direction coverage width at the end portion non-compressed region to the circumferential direction coverage width at the center portion in the axial direction is 2.0 or greater.

6. The cleaning member according to claim 1,
wherein crushed bubbles exist in a portion subjected to the compression process.

7. The cleaning member according to claim 1,
wherein a compression ratio (thickness after compression/thickness before compression×100) of a portion subjected to the compression process is from 10% to 70%.

8. The cleaning member according to claim 1,
wherein a width of an overhang portion in a direction orthogonally intersecting an overhang direction is a fixed width in the overhang direction.

9. The cleaning member according to claim 1,
wherein a width of an overhang portion in a direction orthogonally intersecting an overhang direction is 4 mm or greater.

10. The cleaning member according to claim 1,
wherein the foam elastic layer is formed of two or more strips.

11. An assembled member,
wherein an image holding member capable of holding an image, and a charging device including a charging member that charges the image holding member as a charged member and the cleaning member according to claim 1 that cleans a surface of the charging member in contact with the surface of the charging member are assembled integrally to be attachable and detachable in relation to an apparatus main body.

12. An image forming apparatus, comprising:
an image holding member capable of holding an image; and
a charging device including a charging member that charges the image holding member as a charged member and the cleaning member according to claim 1 that cleans a surface of the charging member in contact with the surface of the charging member.

* * * * *